(12) United States Patent
Yoshimoto (10) Patent No.: US 8,103,374 B2
(45) Date of Patent: Jan. 24, 2012

(54) PROCESSING APPARATUS, CENTER-HOLE WORKING SYSTEM, CENTER-HOLE POSITION DECIDING PROGRAM, AND CENTER-HOLE POSITION DECIDING METHOD

(75) Inventor: Akihiro Yoshimoto, Komatsu (JP)

(73) Assignee: Komatsu NTC Ltd., Toyama (JP)

( * ) Notice: Subject to any disclaimer, the term of this patent is extended or adjusted under 35 U.S.C. 154(b) by 279 days.

(21) Appl. No.: 12/664,716

(22) PCT Filed: Jul. 22, 2008

(86) PCT No.: PCT/JP2008/063104
§ 371 (c)(1),
(2), (4) Date: Dec. 12, 2009

(87) PCT Pub. No.: WO2009/016988
PCT Pub. Date: Feb. 5, 2009

(65) Prior Publication Data
US 2010/0179675 A1   Jul. 15, 2010

(30) Foreign Application Priority Data

Aug. 1, 2007   (JP) .................................. 2007-201323

(51) Int. Cl.
*G06F 19/00* (2011.01)
(52) U.S. Cl. .............................. 700/182; 700/193; 703/7
(58) Field of Classification Search .................. 700/182, 700/193; 703/7
See application file for complete search history.

(56) References Cited

U.S. PATENT DOCUMENTS

| 5,691,909 A | * | 11/1997 | Frey et al. ...................... 700/159 |
| 2010/0101085 A1 | * | 4/2010 | Miura ......................... 29/888.08 |

FOREIGN PATENT DOCUMENTS

| JP | 51-76682 A | 7/1976 |
| JP | 52-46740 A | 11/1977 |
| JP | 5-172682 A | 7/1993 |
| JP | 9-174382 A | 7/1997 |
| JP | 10-9342 A | 1/1998 |
| JP | 10-62144 A | 3/1998 |
| JP | 2001-91244 A | 4/2001 |
| JP | 2007-264746 A | 10/2007 |

* cited by examiner

*Primary Examiner* — Michael D Masinick
(74) *Attorney, Agent, or Firm* — Global IP Counselors (57) ABSTRACT

A processing apparatus includes a three-dimensional shape data acquiring section, a tentative center-hole position determining section, a shape simulating section, a balance deciding section, and a center-hole deciding section. The tentative center-hole position determining section is configured to determine a tentative position of the center holes based on the three-dimensional shape data. The shape simulating section is configured to obtain a simulated shape of the material crankshaft after a working is simulated for the material crankshaft based on the tentative position of the center holes as a reference. The balance deciding section is configured to decide whether a rotational imbalance amount in the simulated shape is within a predetermined allowable range. The center-hole deciding section is configured to decide the tentative position as an actual boring position of the center holes when the rotational imbalance amount is within the predetermined allowable range.

9 Claims, 7 Drawing Sheets

CENTER LINE

PRINCIPAL AXIS OF INERTIA

POSITION 1

POSITION 2

(b) CROSS-SECTION IN POSITION 1

(c) CROSS-SECTION IN POSITION 2

FIG. 7

PROCESSING APPARATUS, CENTER-HOLE WORKING SYSTEM, CENTER-HOLE POSITION DECIDING PROGRAM, AND CENTER-HOLE POSITION DECIDING METHOD

CROSS-REFERENCE TO RELATED APPLICATIONS

This national phase application claims priority to Japanese Patent Application No. 2007-201323, filed on Aug. 1, 2007. The entire disclosure of Japanese Patent Application No. 2007-201323 is hereby incorporated herein by reference.

TECHNICAL FIELD

The present invention relates to a processing apparatus for deciding a position of a center-hole, a center-hole working system, a center-hole position deciding program and a center-hole position deciding method, in boring a center-hole in a crankshaft to be used for engines of automobiles and the like.

BACKGROUND ART

A crankshaft is normally used while it is installed in an engine. When the rotational imbalance occurs in the crankshaft, a variety of problems occur (e.g., generation of vibration in the engine revolution). Therefore, the amount of the rotational imbalance (hereinafter simply referred to as "an imbalance value") of a crankshaft is required to be in a predetermined allowable value range. A position of center holes, used as a reference for the crankshaft working, is important for setting the imbalance value of the crankshaft to be within the allowable value range.

For example, a center hole is formed as follows. First, a balance center axis of a crankshaft (a material crankshaft) is found out. Specifically, a balance meter measures the crankshaft's balance while the material crankshaft is actually rotated. Then, center holes are bored in the both end surfaces of the crankshaft. Positions of the center holes are arranged on the obtained center axis. Furthermore, the balance meter measures balance about the center axis again in the final working phase. When imbalance is found out, the balance adjustment is executed by boring a hole in a counterweight.

When the crankshaft of a material state (i.e., material crankshaft) is finished in an ideal shape recorded in the design data, it is possible to easily set the imbalance value to be in the allowable value range by boring center holes in the center of a main journal. Even if balance disruption occurs in a subsequent working step, balance adjustment can be easily executed by finally boring a hole in the counterweight.

However, thickness of the material crankshaft could be actually formed unevenly due to a variety of factors including e.g., bad casting mold, bad forging mold, impact in trimming and mold stripping. In the working of the material crankshaft, most of the working steps are executed for a cylindrical part of a main journal and a cylindrical part of a pin journal. Therefore, the drawback of the uneven thickness is resolved for the respective cylindrical parts. However, working is hardly executed for the counterweight. Thickness of the counterweight therefore remains to be uneven. As a result, the quantity imbalance remains in the entire material crankshaft.

If the quantity imbalance greatly remains after the working, the imbalance value could not be set to be in the allowable value range, despite that the balance adjustment is executed by boring a hole in the counterweight. Additionally, when the balance adjustment cannot be completed within a predetermined cycle time, for instance, the imbalance value cannot be set to be in the allowable value range. This is because there is limitation for the number of holes allowed to be bored in the balance adjustment when the crankshaft is regarded as an inferior product.

Furthermore, the balance value could not be set to be in the allowable value range unless an essential portion is removed from the crankshaft.

When the imbalance value of the crankshaft cannot be finally set to be in the allowable value range as described above, modification is required for the working treatment. Specifically, the misalignment amount of the center-hole boring position is computed based on the balance measurement of the post-working crank shaft. The misalignment amount is fed back to the center-hole working processing. Then, modification is executed for a treatment in the center-hole working processing. In this case, such a material crankshaft is regarded as an inferior product that the center hole is bored before the feedback of the misalignment amount. Additionally, feedback of the misalignment amount is required every time the product lot of the material is changed. In this case, there is a drawback that a great number of processing steps are required.

Here, Laid-open Japan Patent Application Publication No. JP-A-H09-174382 discloses a method as a technology for deciding a position of center holes in a crankshaft. In the method, a plurality of materials is firstly extracted as samples. Then, regarding the respective extracted materials, a difference is computed between an axial center used as a reference in boring center holes and a position of the actually bored center hole, for instance. Subsequently, the correction amount in deciding the center-hole position is computed by statistically computing impact of the computed difference value on the imbalance amount after the finish working.

On the other hand, Laid-open Japan Patent Application Publication No. JP-A-S51-076682 discloses another technology for deciding a position of center holes. In this case, a dynamic balance point is obtained for the respective end surfaces of the material crankshaft by a dynamic balance test. Subsequently, a shape of a journal section in the material crankshaft is measured, for instance. Based on a result of the measurement, imbalance to occur after the working is arithmetically obtained. A center hole is then bored in an offset position, which is displaced from the dynamic balance point by the imbalance amount.

Note a method for measuring a shape of a workpiece and computing an axis of the workpiece has been known (see Laid-open Japan Patent Application Publication No. JP-A-2001-091244).

SUMMARY OF THE INVENTION

In Laid-open Japan Patent Application Publication No. JP-A-H09-174382, the statistical data collection is required by preliminarily executing working and the like with respect to a lot of samples. Accordingly, there is a drawback of requiring effort, time and cost. Additionally, when the product lot is changed, a drawback is produced that statistical tendency is greatly changed.

According to Laid-open Japan Patent Application Publication No. JP-A-S51-076682, on the other hand, the center-hole position can be decided without using any samples. To detect the reference position for deciding the center-hole position, however, the dynamic balance test is firstly required to be done. To do the dynamic balance test, there is a drawback that preparation of a quite expensive balance meter is required.

In response to this, an object of the present invention is to provide a technology for easily and properly deciding a center-hole position in a crankshaft.

To achieve the aforementioned object, a first aspect of the present invention relates to a processing apparatus for deciding a position of center holes to be bored in a material crankshaft. The processing apparatus includes a three-dimensional shape data acquiring section, a tentative center-hole position determining section, a shape simulating section, a balance deciding section and a center-hole deciding section. The three-dimensional shape data acquiring is configured to acquire three-dimensional shape data of the material crankshaft. The tentative center-hole position determining section is configured to determine a tentative position of the center holes in the material crankshaft based on the three-dimensional shape data. The shape simulating section is configured to obtain a simulated shape after a predetermined working processing is simulated for the material crankshaft using the tentative position of the center hole as a reference. The balance deciding section is configured to decide whether or not the rotational imbalance amount in the simulated shape of the material crankshaft after the working simulation is within a predetermined allowable range. The center-hole deciding section is configured to decide the tentative position of the center holes as an actual boring position of the center holes when the rotational imbalance amount is within the predetermined allowable range.

According to the processing apparatus, the center-hole position is assumed and the working for the material crankshaft is simulated based on the assumed center-hole position. Then, the center-hole position can be appropriately decided before the center hole is actually bored in the center-hole position so that the rotational imbalance amount is within the predetermined allowable range after the working simulation. The configuration can effectively prevent the material crankshaft from being produced as an inferior product. Additionally, the configuration can reduce necessity of the final balance adjustment for the crankshaft after working.

Furthermore, the aforementioned processing apparatus may further include a three-dimensional shape data generating section configured to generate the three dimensional shape data of the material crankshaft based on measurement data and three-dimensional shape design data. Here, the measurement data is obtained by partially measuring the material crankshaft, whereas the three-dimensional shape design data is design data of the material crankshaft. Additionally, the three-dimensional shape data acquiring section may acquire the three-dimensional shape data generated by the three-dimensional shape data generating section.

According to the processing apparatus, the three-dimensional shape data can be generated without measuring the shape of the entire material crankshaft. Therefore, the processing apparatus is not required to be provided with a component for measuring the shape of the entire material crankshaft.

Alternatively, the aforementioned processing apparatus may further include a working condition deciding section configured to decide whether or not an essential portion as a crankshaft is missing in the simulated shape of the material crankshaft obtained by the shape simulating section. Additionally, the center-hole assuming section may assume a new tentative position of the center holes when it is decided that the essential portion is missing in the material crankshaft.

According to the processing apparatus, it is decided whether or not the essential portion is missing in the material crankshaft before the actual working of the material crankshaft. When it is decided that the essential portion is missing in the material crankshaft, a new center-hole position is configured to be assumed. Therefore, the configuration can appropriately prevent the material crankshaft from being produced as an inferior product as a result of the actual working of the material crankshaft.

Alternatively, in the aforementioned processing apparatus, the tentative center-hole position determining section may determine a new tentative position of the center hole when it is decided that the rotational imbalance amount is not within the predetermined allowable range.

According to the processing apparatus, it is configured to be decided whether or not the rotational imbalance amount of the crankshaft after working is within the predetermined allowable range before the actual working of the material crankshaft. Therefore, the configuration can appropriately prevent the material crankshaft from being produced as an inferior product as a result of the actual working of the material crankshaft.

Alternatively, in the aforementioned processing apparatus, the balance deciding section may calculate the rotational imbalance amount in the simulated shape of the material crankshaft. The balance deciding section may decide that the rotational imbalance amount is within the predetermined allowable range when the rotational imbalance amount is equal to or less than a predetermined value.

According to the processing apparatus, it is possible to effectively decide whether or not the rotational imbalance amount of the crankshaft after working is within the predetermined allowable range before the actual working of the material crankshaft.

Furthermore, to achieve the aforementioned object, a second aspect of the present invention relates to a center-hole working system. The center-hole working system includes a processing apparatus and a working apparatus. The processing apparatus includes a three-dimensional shape data acquiring section, a tentative center-hole position determining section, a shape simulating section, a balance deciding section and a center-hole deciding section. The three-dimensional shape data acquiring section is configured to acquire three-dimensional shape data of the material crankshaft. The tentative center-hole position determining section is configured to determine a tentative position of the center holes in the material crankshaft based on the three-dimensional shape data. The shape simulating section is configured to obtain a simulated shape of the material crankshaft after a predetermined working processing is simulated for the material crankshaft using the tentative position of the center holes as a reference. The balance deciding section is configured to decide whether or not a rotational imbalance amount in the simulated shape of the material crankshaft is within a predetermined allowable range. The center-hole deciding section is configured to decide the tentative position of the center holes as an actual boring position of the center holes when the rotational imbalance amount is within the predetermined allowable range. The working apparatus is configured and arranged to actually bore the center hole in the actual boring position of the material crankshaft, which is decided by the center-hole deciding section.

According to the center-hole working system, the center hole can be appropriately bored in the material crankshaft.

Furthermore, the aforementioned center-hole working system may further include a measurement apparatus configured and arranged to partially measure the shape of the material crankshaft. According to the center-hole working system, it is possible to measure the shape of the material crankshaft and decide the center-hole position.

Furthermore, to achieve the aforementioned object, a third aspect of the present invention relates to a computer-readable medium having computer executable instructions for performing a computer process that decides a position of center holes to be bored in a material crankshaft. The computer process includes: acquiring three-dimensional shape data of the material crankshaft; determining a tentative position of the center holes in the material crankshaft based on the three-dimensional shape data; obtaining a simulated shape of the material crankshaft after a predetermined working processing is simulated for the material crankshaft using the tentative position of the center holes as a reference; deciding whether or not a rotational imbalance amount in the simulated shape of the material crankshaft is within a predetermined allowable range; and deciding the tentative position of the center holes as an actual boring position of the center holes when the rotational imbalance amount is within the predetermined allowable range.

When the computer runs the aforementioned center-hole position deciding program, the center-hole position can be appropriately decided before a predetermined working processing is executed for the material crankshaft so that the rotational imbalance amount is within the predetermined allowable range after the predetermined working processing is executed. The configuration can effectively prevent the material crankshaft from being produced as an inferior product. Additionally, the configuration can reduce necessity of the final balance adjustment with respect to the crankshaft after working.

To achieve the aforementioned object, a fourth aspect of the present invention relates to a center-hole position deciding method of deciding a position of center holes to be bored in a material crankshaft. The center-hole position deciding method includes: acquiring three-dimensional shape data of the material crankshaft; determining a tentative position of the center holes in the material crankshaft based on the three-dimensional shape data; obtaining a simulated shape of the material crankshaft after a predetermined working processing is simulated for the material crankshaft using the tentative position of the center holes as a reference; deciding whether or not a rotational imbalance amount in the simulated shape of the material crankshaft is within a predetermined allowable range; and deciding the tentative position of the center holes as an actual boring position of the center holes when the rotational imbalance amount is within the predetermined allowable range.

According to the center-hole position deciding method, the center-hole position can be appropriately decided before the predetermined working processing is executed for the material crankshaft so that the rotational imbalance amount is within the predetermined allowable range after the predetermined working processing is executed. The configuration can effective prevent the material crankshaft from being produced as an inferior product. Additionally the configuration can reduce necessity of the final balance adjustment with respect to the crankshaft after working.

DETAILED DESCRIPTION OF THE EMBODIMENTS

An embodiment of the present invention will be hereinafter explained with reference to the accompanying figures. Note the following embodiment does not limit inventions described in the section of Claims, and means for solving problems is not necessarily required to have all the combinations of characteristics to be explained in the embodiment.

Material Crankshaft

First, an example material crankshaft will be hereinafter explained prior to explanation of a crankshaft working system including a processing apparatus according to an embodiment of the present invention.

Figure 1:
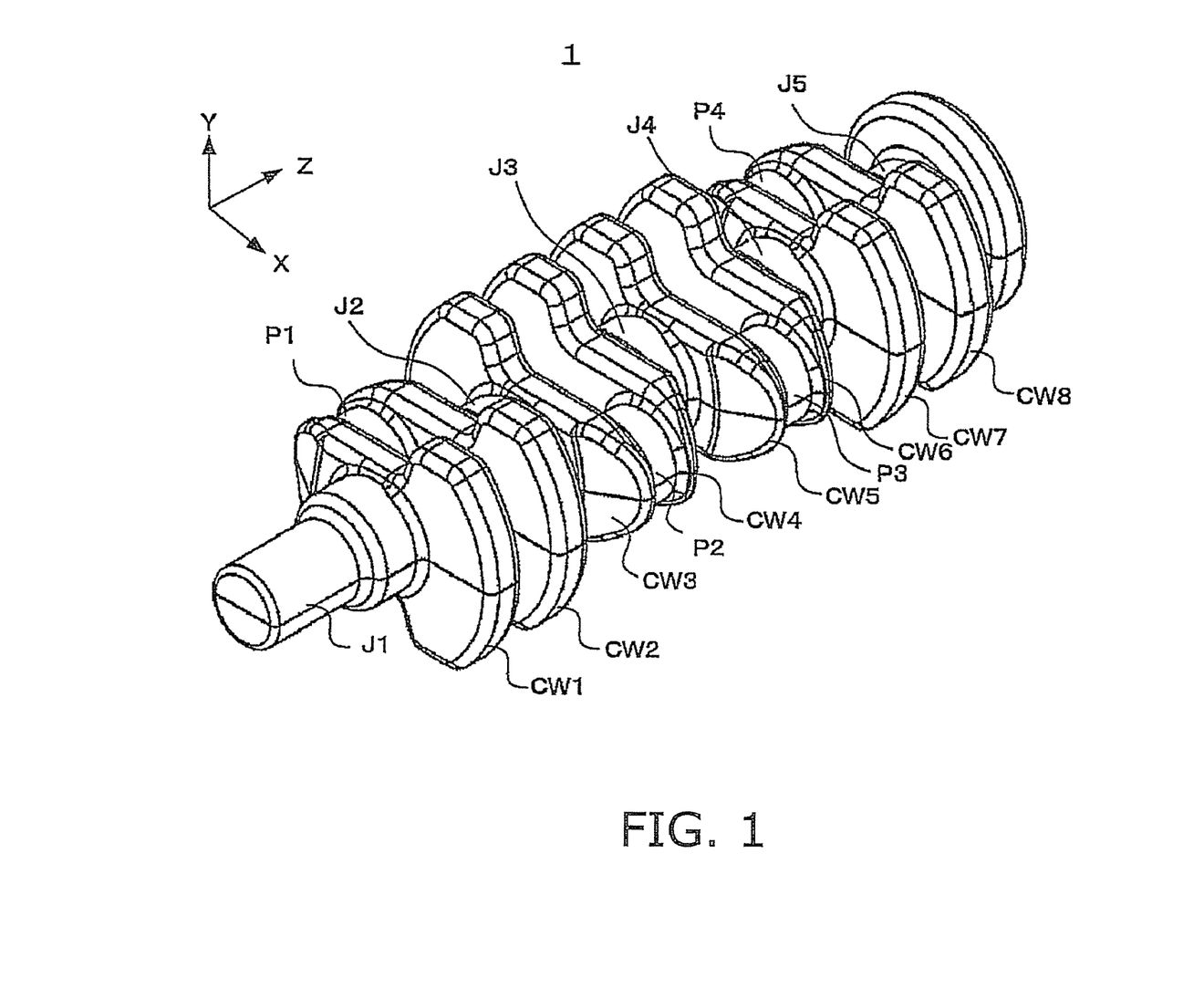
FIG. 1 is an external oblique view of an example material crankshaft.

FIG. 1 is an external oblique view of a material crankshaft according to an embodiment of the present invention. The material crankshaft is used for the serial 4-cylinder engine.

The material crankshaft 1 is formed with an upper mold (top mold) and a lower mold (bottom mold), for instance. The material crankshaft 1 includes main journals J (J1 to J5), pin journals P (P1 to P4) and counterweights CW (CW1 to CW8). In the material crankshaft 1, the following components are sequentially disposed in a Z-axial direction: a main journal J1, a counterweight CW1, a pin journal P1, a counterweight CW2, a main journal J2, a counterweight CW3, a pin journal P2, a counterweight CW4, a main journal J3, a counterweight CW5, a pin journal P3, a counterweight CW6, a main journal J4, a counterweight CW7, a pin journal P4, a counterweight CW8 and a main journal J5.

Working System

Next, a crankshaft working system, including a processing apparatus according to an embodiment of the present invention, will be hereinafter explained.

Figure 2:
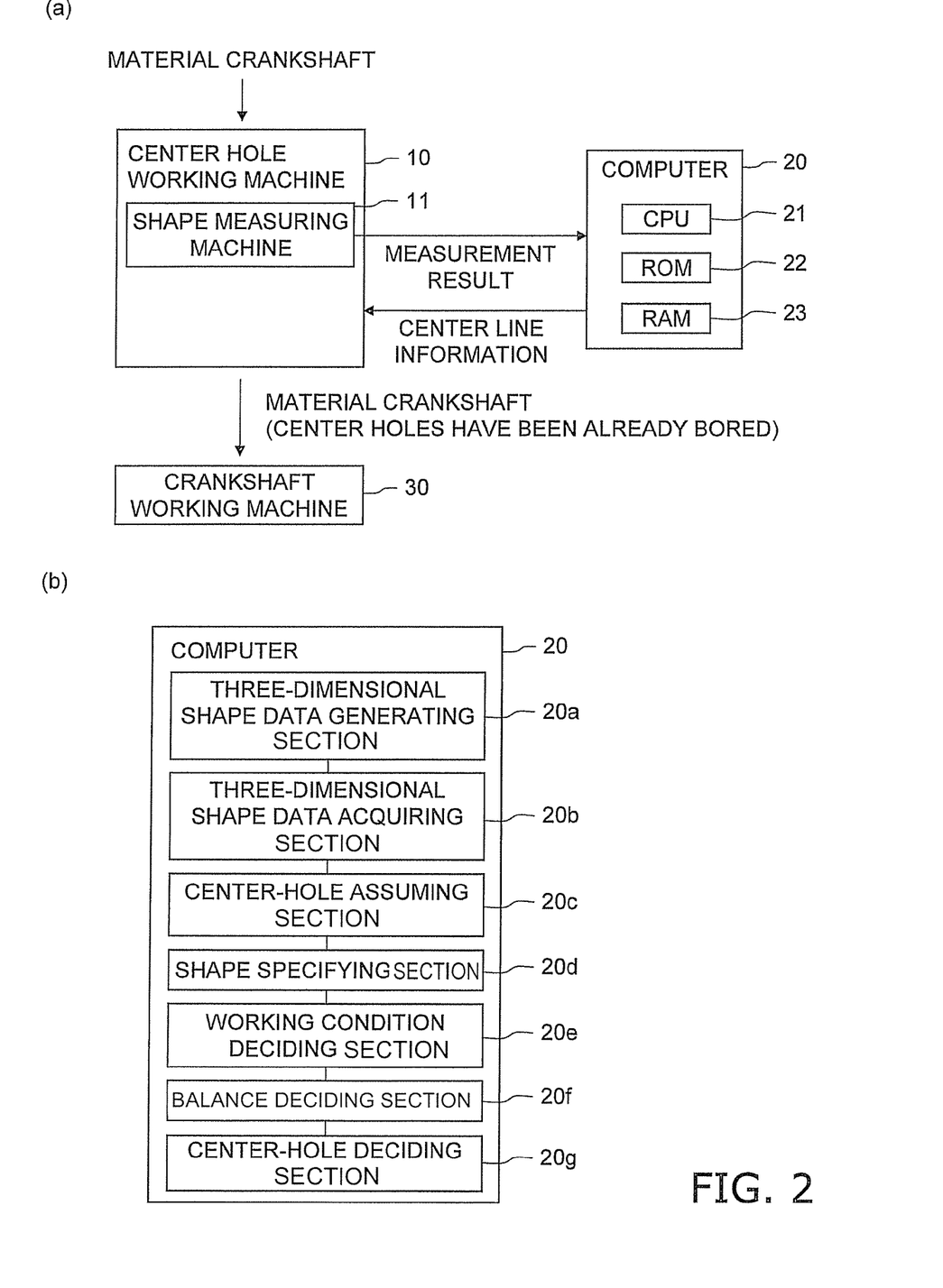
FIG. 2 is a configuration diagram of a crankshaft working system according to an embodiment of the present invention.

FIG. 2 is a configuration diagram of the crankshaft working system according an embodiment of the present invention. FIG. 2A is a hardware configuration diagram of the crankshaft working system according to the embodiment of the present invention. FIG. 2B is a functional configuration diagram of a computer 20 according to the embodiment of the present invention.

The crankshaft working system 100 includes a center-hole working machine 10 (an example of a working apparatus), the computer 20 (an example of processing apparatus) and a crankshaft milling machine 30. The center-hole working machine 10 is an apparatus for boring a center hole in each of the both end surfaces of the material crankshaft 1. The computer 20 decides positions of the center holes to be bored in the both end surfaces of the material crankshaft 1. The crankshaft milling machine 30 executes a predetermined working with respect to the material crankshaft in which the center holes are bored. Note in the present embodiment, the center-hole working machine 10 and the computer 20 (as the processing apparatus) compose the center-hole working system.

The center-hole working machine 10 includes a shape measuring machine 10 as an example of a measuring apparatus. The shape measuring machine 11 measures a shape of the material crankshaft.

The shape measuring machine 11 includes a single or plurality of non-contact displacement meters (e.g., a laser displacement meter, an infrared ray displacement meter and a LED displacement sensor) or a single or plurality of contact displacement meters (e.g., a differential transducer), for instance. The shape measuring machine 11 measures a shape of the material crankshaft 1 based on a single or plurality of measurement values from the single or plurality of the displacement meters. In the present embodiment, for instance, only an outer shape of the counterweight 1 of the material crankshaft is measured. The shape measuring machine 11 may be herein a three-dimensional digitizer (image scanner) for generating the entire shape of a measurement target (i.e., the material crankshaft) as the three-dimensional shape data by measuring it from a plurality of different positions.

The computer 20 includes a CPU (Central Processing Unit) 21, a ROM (Read Only Memory) 22 and a RAM (Random Access Memory) 23.

The ROM 22 stores a variety of information and a variety of programs that the CPU 21 runs. In the present embodiment, the ROM 22 stores an after-mentioned processing program for deciding positions of the center holes in the material crankshaft 1 (center-hole position deciding program). In addition, the ROM 22 stores three-dimensional shape data of the material crankshaft 1 in the design phase (hereinafter referred to as three-dimensional shape design data). Outer shape data of the respective counterweights of the material crankshaft 1 in the design phase can be obtained from the three-dimensional shape design data. Furthermore, the ROM 22 stores contents of working that the crankshaft milling machine 30 executes for the material crankshaft 1. The contents of working include a type of working in which an after-mentioned center line in the material crankshaft 1 and an after-mentioned phase reference line are used as references.

The RAM 23 is used as an area for storing programs and data or as a working area for storing data to be used in the processing by the CPU 21.

When the CPU 21 reads a program out of the ROM 22, loads the program into the RAM 23 and executes the program, the computer 20 functions as three-dimensional shape data generating section 20a, a three-dimensional shape data acquiring section 20b, a center-hole assuming section 20c (a tentative center-hole position determining section), a shape specifying section 20d (a shape simulating section), a working condition deciding section 20e, a balance deciding section 20f and a center-hole deciding section 20g, as illustrated in FIG. 2B. Each processing to be executed will be hereinafter described.

Working Treatment

Figure 3:
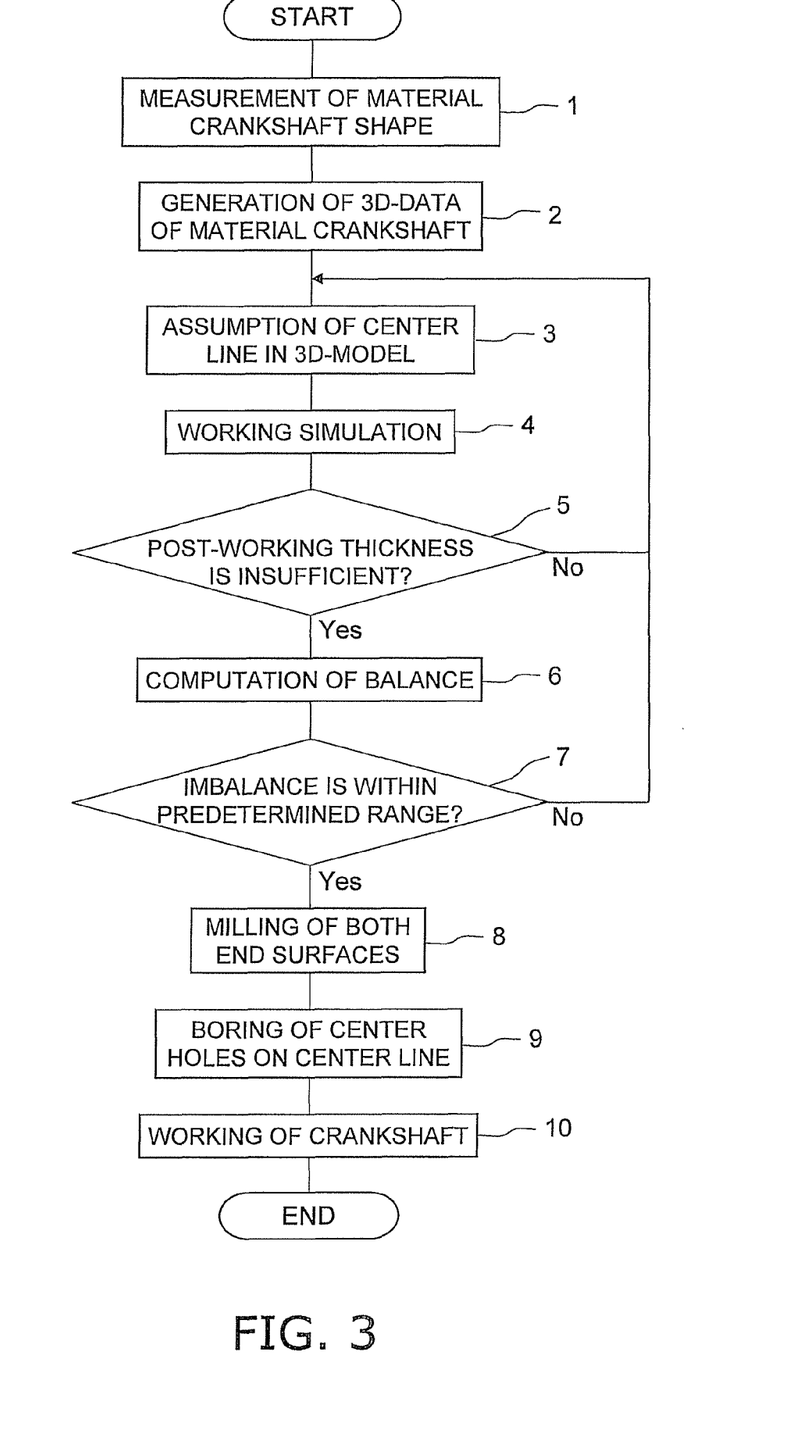
FIG. 3 is a flowchart of crankshaft working treatment according to an embodiment of the present invention.

FIG. 3 is a flowchart of crankshaft working treatment according to an embodiment of the present invention. The crankshaft working treatment is started after an automatic carrying-in device (not illustrated in the figure) unloads a forged material crankshaft 1 on a temporary receiver (not illustrated in the figure) within the center-hole working machine 10.

Working Treatment

Positioning

The center-hole working machine 10 holds the material crankshaft 1 disposed on the temporary receiver with a workpiece clamper and a phase-adjustment clamper (both clampers are not illustrated in the figure) and accurately sets the material crankshaft 1 in a predetermine position.

Working Treatment

Workpiece Chuck

Next, the material crankshaft 1 is held by an automatic centering workpiece chuck for measuring a shape of the material crankshaft 1 in the center-hole working machine 10. Specifically, the center of the automatic centering chuck is adjusted to be matched with the center position of the material crankshaft 1. The automatic centering chuck is then proceeded toward the material crankshaft 1 from the axially outside of the material crankshaft 1. The material crankshaft 1 is accordingly held by the automatic centering workpiece chuck. In this case, the material crankshaft 1 is automatically centered by the automatic centering workpiece chuck. In other words, the center of the material crankshaft 1 is held by the workpiece chuck.

After the material crankshaft 1 is held by the workpiece chuck, the center-hole working machine 10 causes the workpiece damper and the phase-adjustment clamper, holding the material crankshaft 1, to unclamp the material crankshaft 1

Working Treatment

Shape Measurement and Reproduction of Three-Dimensional Shape Data

Next, the workpiece chuck is rotated by turning a turntable. In conjunction with this, the material crankshaft 1 is rotated. Meanwhile, the shape measuring machine 11 measures the entire peripheral shape of each of the plurality of counterweights of the material crankshaft at one time with a plurality of displacement meters (Step S1). A single rotation is enough for the measurement. In this case, the shape measuring machine 11 computes a polar coordinate by simultaneously obtaining measurement values of the displacement meters and a measurement value of an encoder provided in relation to the turntable. The polar coordinate is computed for the entire periphery of each counterweight. Accordingly, the polar coordinates of the entire periphery of each counterweight (shape data: measurement data) are computed. The shape data is transmitted to the computer 20 from the shape measuring machine 11. Note measurement for a shape of each counterweight is executed in at least several points (e.g., points (1) to (6) illustrated in FIG. 4). Alternatively, a shape of each main journal or a shape of each pin journal may be herein measured. Yet alternatively, measurement may be executed not only in the aforementioned several points but also in much more points. Furthermore, the shape data may be corrected based on the amount of deflection of the material crankshaft 1 at the time of measurement.

In the present embodiment, the shape of the material crankshaft 1 is configured to be measured under the condition that the material crankshaft 1 is rotated in the shape measuring machine 11. However, measurement of its shape is not limited to the configuration. For example, the entire peripheral shape of each counterweight may be measured at a time by moving two displacement meters under a condition that the material crankshaft 1 is fixed and vertically interposed between the displacement meters. In this case, the shape measuring machine 11 computes the shape data (XY coordinate) based on measurement values by the displacement meters and positions of the displacement meters to be read by the encoder.

In the present embodiment, the displacement meters and the like are disposed in positions for allowing them to be separated through a shatter from a space where working is executed by the center-hole working machine 10. When measurement of the shape is executed, the shatter is configured to be opened. Measurement of the shape is thereby enabled. When working is executed, on the other hand, the shatter is configured to be closed. Impact of dust to be produced by working and the like are thus blocked. After the aforementioned measurement of the shape, the shatter is configured to be closed.

When Step S1 is completed, the CPU 21 of the computer 20 receives the shape data from the shape measuring machine 11. Next, the CPU 21 compares the actual counterweights' shape data that it received and the shape data to be obtained from the counterweights' three-dimensional shape design data stored in the ROM 22. The CPU 21 then computes numeric values representing differences between them (e.g., difference in sizes, displacement in up, down, right and left directions, and displacement in angles).

Next, the CPU 21 modifies the three-dimensional shape design data of the counterweights with the computed numeric values. With the configuration, three-dimensional shape data, corresponding to the shapes of the actual counterweights, can be generated. Furthermore, to make the reproduced actual counterweights smoothly continue to each other, the CPU 21 modifies sizes, displacement in up, down, right and left directions, and displacement in angles of the journals (main journals and pin journals) disposed between the counterweights with respect to the three-dimensional shape design data (Step S2). With the configuration, three-dimensional (3D) shape data, corresponding to the measured actual material crankshaft 1, is reproduced. Note when the shape measuring machine 11 is a three-dimensional digitizer, the three-dimensional shape design data is not obviously required. In this case, the three-dimensional digitizer is configured to output the three-dimensional shape data.

A: Reproduction of Three-Dimensional Shape Data of L4 Crankshaft

An example treatment of reproducing the three-dimensional shape data of a crankshaft for the serial 4-cylinder engine (L4 crankshaft) will be hereinafter explained in detail.

The following failures due to casting molds can be assumed as the reasons for imbalance in the material crankshaft. Specifically, the assumable failures are: a failure due to misalignment between the top mold and the bottom mold; a failure due to bending of the material when the material is removed from the molds; and a failure due to bending of the material in trimming for removing burr from the material.

The failure due to misalignment between the top mold and the bottom mold occurs when the top mold and the bottom mold are misaligned to each other, even though the material crankshaft is produced in accordance with the design of the top and bottom molds. For example, the failure of this type specifically occurs in the following situations: when thickness of the entire material is increased because the top and bottom molds are spaced apart due to an excessively large amount of material; when the material is formed in a misaligned shape because the top and bottom molds are misaligned; when the top and bottom molds are angled, respectively; and when the aforementioned failures occur in combination.

(a) Response to Misalignment Between Top and Bottom Molds

First, example reproduction of the three-dimensional shape data in the material crankshaft will be hereinafter explained, which can cope with the failure occurring due to misalignment of the top and bottom molds.

The degree-of-freedom of the displacement amount for each of the top and bottom molds is six. In short, each of the top and bottom molds has displacements in parallel to the X, Y and Z axes (see FIG. 1) and displacements in the rotational directions of the respective axes. The displacement amounts in parallel to the X, Y and Z axes are herein defined as X, Y and Z, respectively, whereas the displacement amounts in the rotational directions of the respective axes are defined as A, B and C, respectively. The Z-directional displacement hardly has an impact on imbalance of the crankshaft in the rotational direction. In other words, the displacement amounts X, Y, A, B and C of the aforementioned displacement amounts have actually impact on imbalance of the crankshaft in the rotational direction. In the present embodiment, shapes of the counterweights are therefore measured for computing the five displacement amounts. Bending of the material can be computed by measuring the five displacement amounts with respect to all the counterweights.

The CPU 21 of the computer 20 detects a position where each actual material counterweight and each corresponding design counterweight are best fitted with use of the shape data of the outer periphery of each counterweight (measurement shape data) received from the shape measuring machine 11 and the shape data of the outer periphery of each design counterweight (design shape data). For example, the CPU 21 moves the shape represented by the measurement shape data in up, down, right and left directions. The CPU 21 then detects a position where sum of squared error of coordinate values is minimized between each coordinate corresponding to the moved shape and each corresponding coordinate of the design shape.

After the detection of the best-fit position, the CPU 21 computes an error (profile error) between the design shape and the actual measured shape regarding the entire periphery of each counterweight. Based on the error, the CPU 21 computes deformation of each counterweight due to parallel displacements in the axial directions of the top and bottom molds and displacements thereof in the rotational directions of the respective axes. The CPU 21 then reflects the deformation in the three-dimensional shape design data. Thus, the CPU 21 produces the three-dimensional shape data for representing a shape and a position of each actual counterweight.

Figure 4:
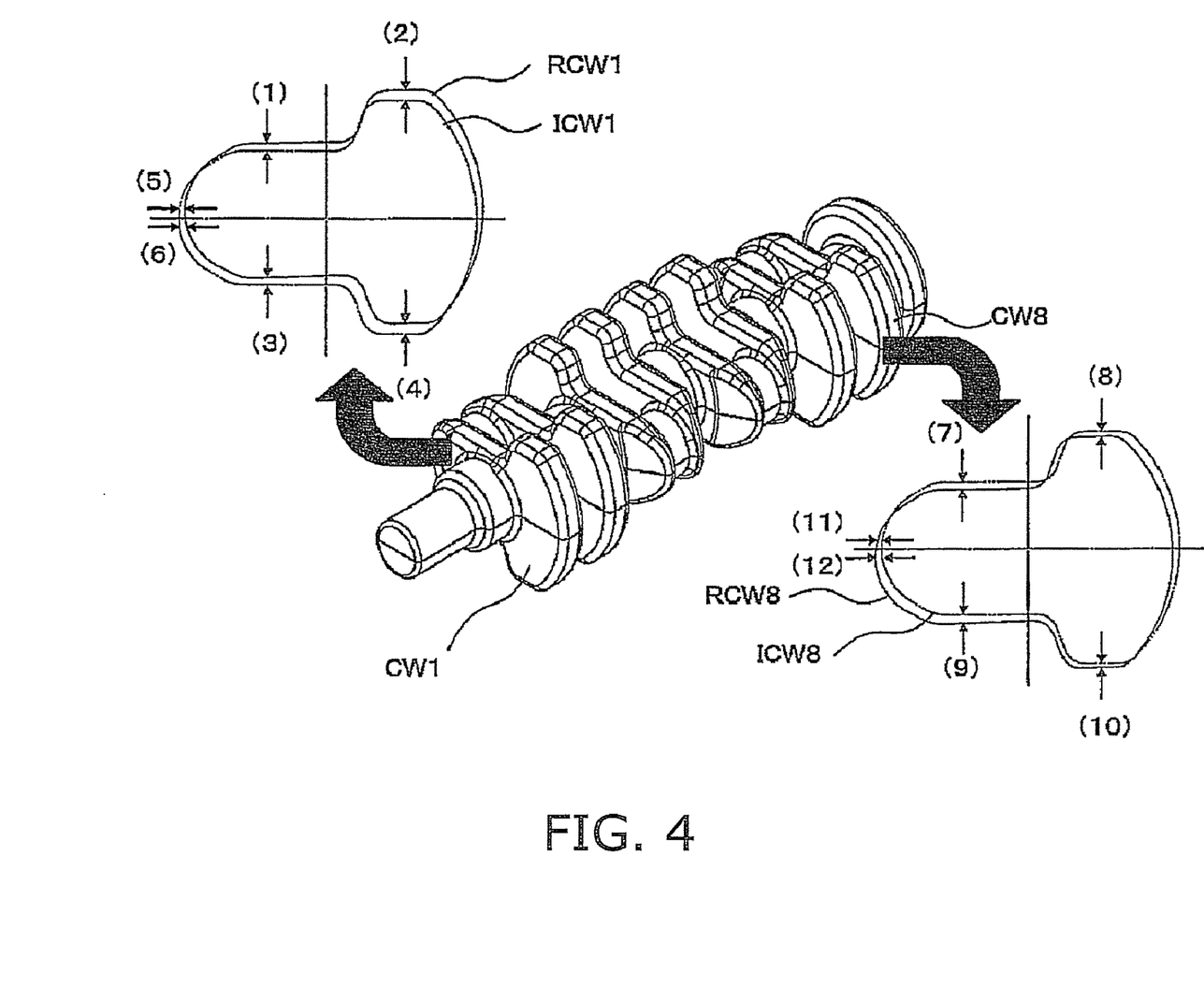
FIG. 4 is a first diagram for explaining formation of a three-dimensional shape of the material crankshaft according to an embodiment of the present invention.

FIG. 4 is a first diagram for explaining creation of a 3D shape of a material crankshaft according to an embodiment of the present invention.

As illustrated in FIG. 4, in the present embodiment, for instance, errors in positions (1) to (12) are obtained between an actual shape RCW1 (for the counterweight CW1 positioned in one end of the crankshaft) and a design shape ICW1, and between an actual shape RCW8 (for the counterweight CW8 positioned in the other end of the crankshaft) and a design shape ICW8. Based on the errors in the 12 positions, displacement amounts X, Y, A, B and C are computed. Further, the three-dimensional shape data, representing the actual counterweights, are produced by modifying the three-dimensional shape design data stored in the ROM 22 based on the displacement amounts. When the top mold and the bottom mold are misaligned, it is possible to compute the displacement amounts of the counterweights (CW2 to CW7) interposed between the counterweights CW1 and CW8 based on the displacement amounts of the counterweights CW1 and CW8. This is because a linear relation is established among the shapes of the counterweights CW2 to CW7 between the counterweights CW1 and CW8. With the configuration, it is possible to produce the three-dimensional shape data including these counterweights.

Next, the CPU 21 modifies the three-dimensional shape design data so that the center part of each of the journals (i.e., the main journals and the pin journals) interposed among the counterweights can smoothly continue to the counterweights disposed on the both sides of each journal. The modification is herein executed for the corresponding part of the three-dimensional shape design data, for instance, by stretching (expansion and contraction). With the aforementioned treatment, it is possible to produce the three-dimensional shape data for appropriately representing the actual shape of the material crankshaft 1.

(b) Response to Material Bending

Next, example reproduction of the three-dimensional shape data in the material crankshaft will be hereinafter explained, which can even deal with cases that the material is not formed in accordance with a design of the top and bottom molds. The cases include: when a failure occurs due to material bending in the removal of the material from the molds; and when a failure occurs due to material bending in trimming for removing burr from the material.

The cases that the material is not formed in accordance with the design of the top and bottom molds specifically indicate the cases that the respective journals and counterweights independently deform in trimming or the removal of the material from the molds. Note failures of the material are often caused by the aforementioned material bending from an empirical standpoint of view.

To response to the above cases, it is necessary to prepare three-dimensional shape design data, which is divided into pieces as much as possible, and generate the three-dimensional shape data of the actual material crankshaft by stretching, moving, rotating and the like with respect to the respective divided pieces.

In response to this, each counterweight can be handled as an individual piece in the three-dimensional shape design data. In this case, the shape measuring machine 11 is required to preliminarily measure the shapes of all the counterweights.

In the present example, the CPU 21 detects a position where each actual material counterweight and each corresponding design counterweight are best fitted with use of the shape data of the outer periphery of each respective counter weight (measurement shape data) and the shape data of each design counterweight (the three-dimensional shape design data). In the present example, the CPU 21 detects the best-fit position by executing rotational movement of the shape represented by the measurement shape data in addition to the up, down, right and left movement thereof.

After the detection of the best-fit position, the CPU 21 computes a profile error of each counterweight and obtains errors of each counterweight in plural positions corresponding to points (1) to (6) illustrated in FIG. 4. Next, based on the errors, the CPU 21 computes deformation of each counterweight due to the parallel displacements of the top and bottom molds in the axial directions and the displacements thereof in the rotational directions of the respective axes. The CPU 21 then reflects the deformation in the three-dimensional shape design data of each counterweight. Next, the CPU 21 executes deformation for making the three-dimensional models of the counterweights smoothly continue to each other.

Thus, the CPU 21 generates the three-dimensional shape data of the material crankshaft. When the counterweights are herein connected to each other, the three-dimensional shape data is generated by executing modification of deforming the journals disposed among the counterweights, respectively. With the aforementioned treatment, it is possible to produce the three-dimensional shape data for appropriately representing the shape of the material crankshaft.

B: Reproduction of Three-Dimensional Shape Data of V6 Crankshaft

Next, an example treatment of reproducing three-dimensional shape data of a crankshaft for the V6-cylinder engine (V6 crankshaft) will be hereinafter explained in more detail.

In the V6-crankshaft, twisting (torsional working) is normally executed for the forged material crankshaft. Therefore, it is required to consider failures (e.g., too small/large twisting angle) caused by a twisting machine for executing twisting. The rotation-directional displacement amount (error) D between the actual twisting angle and the design twisting angle corresponds to the angle displacement of the entire counterweights formed with the top and bottom molds.

(a) Response to Misalignment Between Top and Bottom Molds

First, example reproduction of the three-dimensional shape data in the material crankshaft will be hereinafter explained, which can cope with cases that the top and bottom molds are misaligned.

In the present example, the CPU 21 detects a position where each actual counterweight and each design counterweight are best fitted with use of the shape data of the outer periphery of each counterweight (measurement shape data) and the shape data of each design counterweigh (three-dimensional shape design data). In the present example, the CPU 21 detects the best-fit position by executing rotational movement with respect to the shape represented by the shape data in addition to the up, down, right and left directions thereof The rotational amount of the shape of each actual counterweight, in detecting the best-fir position, corresponds to the displacement amount D, which is the angle error between each actual counterweight and each corresponding design counterweight.

Figure 5:
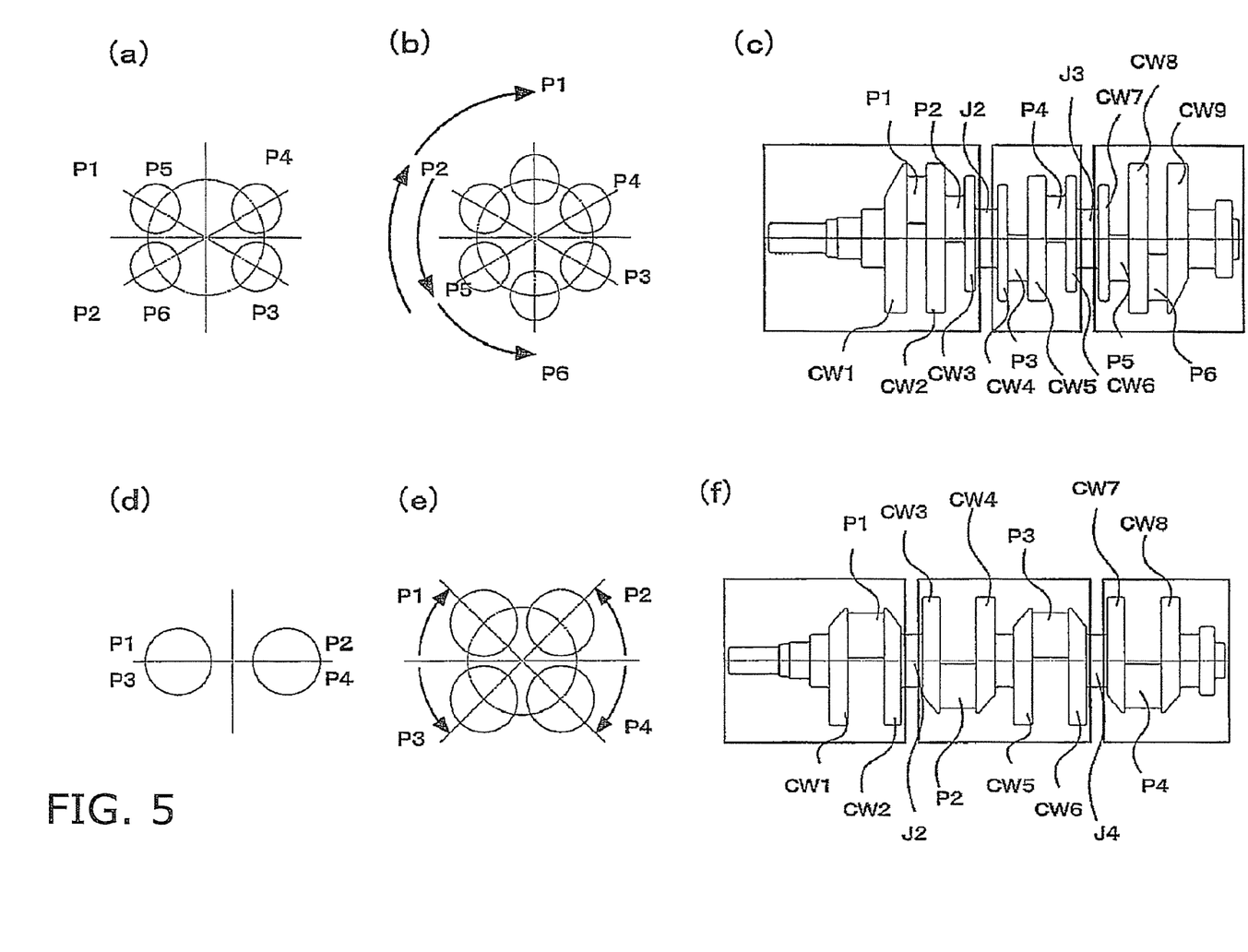
FIG. 5 is a second diagram for explaining formation of a three-dimensional shape of the material crankshaft according to the embodiment of the present invention.

FIG. 5 is a second diagram for explaining generation of the three-dimensional shape data of a material crankshaft according to an embodiment of the present invention.

As illustrated in FIG. 5(c), the V6 crankshaft includes nine counterweights CW1 to CW9. When the V6 crankshaft illustrated in FIG. 5(c) is seen from the left side (i.e., front side) after forging thereof, the pin journals P1 to P6 are disposed in any of four areas as illustrated in FIG. 5(a).

As illustrated in FIG. 5(b), a twisting machine twists a section including the counterweights CW1 to CW3 about the main journal J2 at 60 degrees in the clockwise direction. Furthermore, the twisting machine twists a section including the counterweights CW7 to CW9 about the main journal J3 at 60 degrees in the counterclockwise direction. Thus, the material crankshaft, obtained after forging, is set to have a V6-engine pin-journal arrangement. Note the counterweights CW4 to CW6 are not rotated because they are used as references of twisting.

Thus, the V6 crankshaft is twisted in two positions (i.e., the main journals J2, J3). Therefore, the displacement amount D can be obtained in the two positions by executing best-fitting of the counterweights.

Based on this, the CPU 21 reproduces the shape of each pre-twisting counterweight, that is, the shape of each material counterweight immediately after forging, by rotating the shape of each measured counterweight in the counter-twisting direction at an angle to be obtained by reflecting a twisting error in a predetermined twisting amount (e.g., 60 degrees). This makes it possible to compare the designed shape of the V6 crankshaft in forging and the shape of the post-twisting V6 crankshaft.

Therefore, similar to the aforementioned treatment for the L4 crankshaft, the CPU 21 computes deformation of each counterweight due to the parallel displacements of the top and bottom molds in the axial directions and the displacements thereof in the rotational directions of the respective axes based on the measurement value corresponding to each material counterweight immediately after forging. The CPU 21 then reflects the deformation in the three-dimensional shape design data of the V6 crankshaft in forging. Thus, the CPU 21 generates the three-dimensional shape data representing the actual crankshafts in forging (i.e., before twisting). Next, the CPU 21 deforms twisting target sections of the material crankshaft in the three-dimensional shape data. Here, the deformation corresponds to twisting in which a twisting error (displacement amount D) is reflected in the twisting amount. Thus, the CPU 21 produces the three-dimensional shape data of the post-twisting material crankshaft. With the aforementioned treatment, it is possible to produce the three-dimensional shape data for appropriately representing the actual crankshaft.

(b) Response to Material Bending

When a failure occurs due to material bending caused in trimming for removing burr from the material, that is, when the material is not formed in accordance with a design of the top and bottom molds, reproduction of the three-dimensional shape data of the V6 crankshaft can be achieved by a similar treatment to the aforementioned response to the material bending of the L4 crankshaft.

Specifically in the case of the V6 crankshaft, the CPU 21 computes a profile error of each counterweight after the best-fitting of the counterweight. Accordingly, the CPU 21 obtains shape information of each counterweight. The shape information herein includes errors of each counterweight in plural positions corresponding to the points (1) to (6) illustrated in FIG. 4, and a rotated angle in the best-fitting of the counterweight (corresponding to a twisting angle that includes an error).

Based on the shape information, the CPU 21 modifies the three-dimensional shape design data of the material crankshaft. With the aforementioned treatment, it is possible to produce the three-dimensional shape data for appropriately representing the shape of the actual material crankshaft.

C: Reproduction of Three-Dimensional Shape Model of V8 Crankshaft

Next, an example treatment of reproducing three-dimensional shape data of a crankshaft for the V8-cylinder engine (V8 crankshaft) will be hereinafter explained in more detail.

Similar to production of the V6 crankshaft, twisting (torsional working) is executed for a normally forged material crankshaft in producing the V8 crankshaft. Therefore, it is required to assume failures (e.g., too large/small twisting angle) to be caused by a twisting machine for executing twisting.

(a) Response to Displacement Between Top and Bottom Molds

As illustrated in FIG. 5(f), the V8 crankshaft includes eight counterweights CW1 to CW8. When the V8 crankshaft illustrated in FIG. 5(f) is seen from the left side (i.e., front side) after forging, the respective pin journals P1 to P4 are disposed in two areas as illustrated in FIG. 5(d).

A twisting machine twists a section including the counterweights CW1, CW2 about the main journal J2 at 45 degrees in the clockwise direction seen from the front side. The twisting machine also twists a section including the counterweights CW7, CW8 about the main journal J4 at 45 degrees in the clockwise direction. Moreover, the twisting machine twits a section including the counterweights CW3, CW4, CW5 and CW6 about the main journals J2, J4 at 45 degrees in the counterclockwise direction. Accordingly, the material crankshaft after forging is set to have a pin-journal arrangement for the V8 engine as illustrated in FIG. 5(e).

The V8 crankshaft is thus twisted about two positions (i.e., the main journals J2, J4). Therefore, the displacement amounts D in the two positions can be obtained by executing the best-fitting.

Based on this, the CPU 21 reproduces the shape of each pre-twisting counterweight, i.e., the shape of each material counterweight immediately after forging, by rotating the shape of each measured counterweight in the counter-twisting direction at an angle to be obtained by reflecting a twisting error in a predetermined twisting amount (e.g., 45 degrees). This makes it possible to compare the designed shape of the V8 crankshaft in forging and the shape of the post-twisting V8 crankshaft.

Therefore, similar to the aforementioned treatment for the L4 crankshaft, the CPU 21 computes deformation of each counterweight due to the parallel displacements of the top and bottom molds in the axial directions and the displacements thereof in the rotational directions of the respective axes based on the measurement value corresponding to the corresponding material counterweight immediately after forging. Then, the CPU 21 reflects the deformation in the three-dimensional shape design data of the V8 crankshaft in forging. Thus, the CPU 21 produces the three-dimensional shape data representing the actual crankshaft in forging (i.e., before twisting). Next, the CPU 21 deforms twisting target sections of the material crankshaft in the three-dimensional shape data. Here, the deformation corresponds to twisting in which a twisting error is reflected in the twisting amount. Thus, the CPU 21 produces the three-dimensional shape data of the post-twisting material crankshaft. With the aforementioned treatment, it is possible to produce the three-dimensional shape data for appropriately representing the actual crankshafts.

(b) Response to Material Bending

When a failure occurs due to material bending in trimming for removing burr from the material, that is, when the material is not formed in accordance with a design of the top and bottom molds, reproduction of the three-dimensional shape data of the V8 crankshaft can be achieved by a treatment similar to the aforementioned response to the material bending of the L4 crankshaft.

Specifically in the case of the V8 crankshaft, the CPU 21 computes a profile error of each counterweight after the best-fitting of the counterweight. The CPU 21 then obtains shape information of each counterweight. The shape information includes errors of each counterweight in plural positions corresponding to the points (1) to (6) illustrated in FIG. 4, and a rotated angle in the best-fitting of the counterweight (corresponding to a twisting angle that includes an error). Based on the shape information, the CPU 21 modifies the three-dimensional shape design data of the material crankshaft. With the aforementioned treatment, it is possible to produce the three-dimensional shape data for appropriately representing the shape of the material crankshaft.

Working Treatment

Assumption of Center Hole

Now, with reference to FIG. 3 again, after the three-dimensional shape data of the material crankshaft 1 is produced, the CPU 21 assumes (tentatively determines) a center line that indicates positions of center holes, and simultaneously assumes a phase reference line, which is a reference for a phase in working (Step S3). The center line is a line passing through the centers of the main journals on the both ends of the material crankshaft in the three-dimensional model represented by the three-dimensional shape data. On the other hand, the phase reference line is a perpendicular line drawn from the center of a predetermined reference pin journal (e.g., the pin journal P1) to the aforementioned center line.

Working Treatment

Working Simulation

Next, using the produced three-dimensional shape data of the actual material crankshaft 1, the CPU 21 simulates a series of working based on the assumed center line (the tentative position of the center holes) and phase reference line (Step S4). The series of working ends with a predetermined working step (e.g., a final working processing for each journal) stored in the ROM 22.

Working Treatment

Decision of Working Failure

Next, the CPU 21 decides whether or not the material crankshaft 1 has a thickness to be required as a crankshaft at the time when simulation of the predetermined working processing is completed (Step S5). If the post-working crankshaft 1 includes an inwardly recessed portion that should not be formed in its final outer shape, this is regarded as a state of lacking of the required thickness.

When it is decided that the crankshaft 1 lacks of the required thickness (No in Step S5), the crankshaft 1 lacks of stiffness required as a crankshaft and the like. In other words, an appropriate crankshaft cannot be obtained with the currently assumed center line and phase reference line. Therefore, the CPU 21 returns the processing to Step S3, and resets at least either of the position of the center line and that of the phase reference line so that the crankshaft 1 can have the required thickness.

Working Treatment

Balance Decision

On the other hand, when the crankshaft has the required thickness (Yes in Step S5), balance of the post-working crankshaft is computed (Step S6).

Computation of crankshaft balance will be hereinafter explained in detail.

Figure 6:
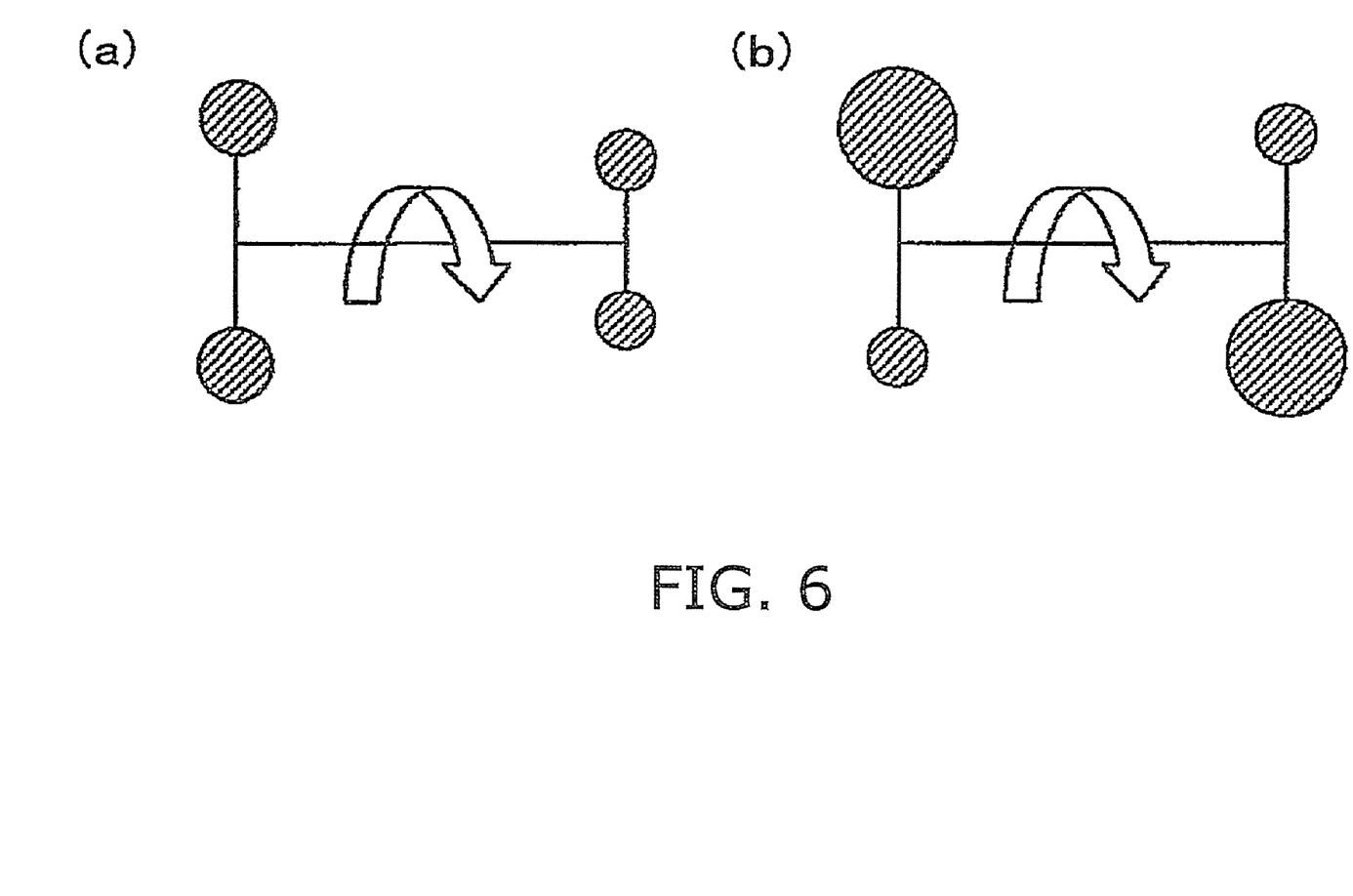
FIG. 6 is a diagram for explaining the rotational imbalance amount of the crankshaft according to the embodiment of the present invention.

FIG. 6 is a diagram for explaining the rotational imbalance amount of the crankshaft according to an embodiment of the present invention.

When balance of a rotating object is considered in general, both of static balance and dynamic balance should be considered. The static balance herein refers to symmetry with respect to a rotational axis. A state of static balance means that an object stays in the original position without moving even if it is directed to an arbitral angle within 360 degrees under the condition that the rotation axis is maintained in a horizontal position. In the state of static balance, the rotational axis passes through the center of gravity of the object. On the other hand, a state of dynamic balance means that good static balance is achieved in the axial direction.

For example, FIG. 6(a) illustrates an object that is dynamically and statically balanced. On the other hand, FIG. 6(b) illustrates an object that is statically balanced but not dynamically balanced. When the object illustrated in FIG. 6(b), which is not dynamic balanced, is rotated about the rotational axis, the object entirely generates vibration because centrifugal force depends on a position of the axis. The reason is that the rotational axis is matched with the principal axis of inertia in FIG. 6(a) but this is not the case in FIG. 6(b).

As described above, the dynamically balanced state refers to a state that the rotational axis is matched with the principal axis of inertia.

Based on this, in the present embodiment, distance is computed between the firstly-assumed center line and the principal axis of inertia in the decision of the rotational imbalance amount of the crankshaft. When the difference is equal to or less than a predetermined value, the crankshaft is regarded as an entirely dynamically-balanced crankshaft.

Next, a treatment of deciding the rotational imbalance amount of the crankshaft will be explained in more detail.

Figure 7:
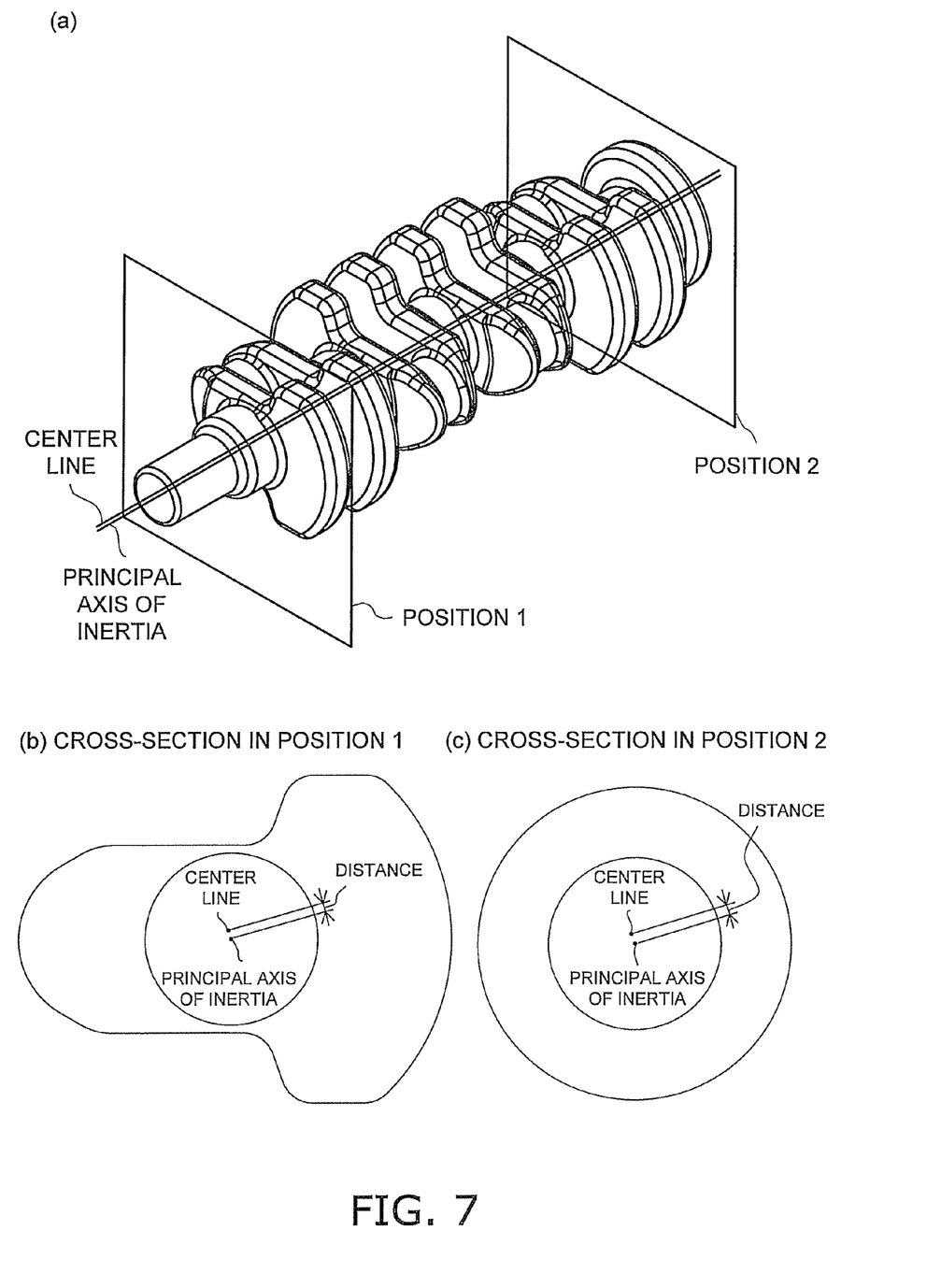
FIG. 7 is a diagram for explaining imbalance of the crankshaft according to the embodiment of the present invention.

FIG. 7 is a diagram for explaining computation of imbalance of the crankshaft according to an embodiment of the present invention.

Based on the three-dimensional shape data, the CPU 21 firstly grasps the shape of the crankshaft for which working simulation is executed up to a predetermined working processing and computes the principal axis of inertia of the crankshaft.

After the principal axis of inertia of the crankshaft is computed, the CPU 21 computes distance between the center line and the principal axis of inertia on two cross-sections perpendicular to the center line in two predetermined positions along the crankshaft's axial direction. The CPU 21 then decides whether or not the distance in each position is within a predetermined range, in other words, whether or not imbalance in each position is within a predetermined allowable range (Step S7). In the present embodiment, the CPU 21 decides whether or not the crankshaft's imbalances in two positions are equal to or less than a predetermined value, respectively. When both of the distances are equal to or less than the predetermined value, it is decided that the crankshaft's imbalance is within a predetermined range and the rotational imbalance amount is within an allowable range. On the other hand, when at least either of the distances exceeds the predetermined value, it is decided that the crankshaft's imbalance is out of the predetermined range and the rotational imbalance amount is out of the allowable range.

As a result, when the crankshaft's imbalance is out of the predetermined range (No in Step S7), the post-working crankshaft generates large vibration. This means that a crankshaft of good quality cannot be obtained by the working. In this case, the CPU 21 accordingly returns the processing to Step S3 in this case, and resets at least either of the position of the center line and that of the phase reference line so that the crankshaft's imbalance can be reduced.

In principle, both of the V6 crankshaft and the V8 crankshaft cannot be dynamically balanced as a single component. In response to this, it is possible to obtain a similar result to the L4 crankshaft by adding a single or plurality of computational counterweights thereto in computing the principle axis of inertia.

On the other hand, when the crankshaft's imbalance is within the predetermined range (Yes in Step S7), the CPU 21 decides the assumed center line and phase reference line as references in working, and notifies the center-hole working machine 10 of the information indicating the center line and the phase reference line. The reason is that a crankshaft, generating less vibration in its rotation, can be obtained by executing subsequent working processing based on the assumed center line and phase reference line if the crankshaft's imbalance is within the predetermined range.

Note balance decision is not limited to the aforementioned example. For example, only the counterweight section may be extracted and a center line may be obtained for allowing only the counterweight section to be dynamically balanced. The reason is that a main-journal section and a pin-journal section, which are produced in working, are both theoretically balanced and are thereby negligible in the balance computation.

Working Treatment

Actual Working of Center Hole

When receiving the aforementioned notification, the center-hole working machine 10 clamps the material crankshaft 1 with the workpiece clamper, and unlocks and retracts the workpiece chuck. Next, the center-hole working machine 10 executes milling for the both end surfaces of the material crankshaft 1 with a milling cutter in order to obtain the notified center line and phase reference line (Step S8).

Next, the center-hole working machine 10 adjusts positions of the center drills provided on the both sides of the material crankshaft 1 so that the center drills can be arranged along the notified centerline of the material crankshaft 1. Then, holes arranged along the center line (i.e., center holes) are bored in the both end surfaces of the material crankshaft 1 (Step S9). Thus, it is possible to bore the center holes that enable production of an appropriate crankshaft after working. Additionally, in the present embodiment, the material crankshaft 1, measured by the shape measuring machine 11, is held by the identical workpiece clamper in the measurement position without being transported to the outside. Then, the center-hole working machine 10 is configured to bore the center holes therein. Therefore, it is possible to appropriately avoid a situation that coordinates of the respective parts of the material crankshaft 1 are misaligned with those in measurement. Consequently, it is possible to highly accurately bore the center holes in appropriate positions.

Working Treatment

Actual Working of Crankshaft

Next, an automatic transporting machine (not illustrated in the figure) transports the material crankshaft 1, in which the center holes are bored, to the crankshaft milling machine 30. The crankshaft milling machine 30 places the material crankshaft 1 thereon whilst the bored center holes are used as references, and executes a predetermined working processing for the material crankshaft 1 (Step S10). An appropriate balanced crankshaft can be thereby obtained.

Other Embodiments

The present invention has been explained based on the aforementioned embodiments. However, the present invention is not limited to the aforementioned embodiments, and is applicable to any other various aspects.

For example, an integrated apparatus may be composed of the shape measuring machine 11 and the computer 20. Alternatively, an integrated apparatus may be composed of the center-hole working machine 10 and the computer 20.

Furthermore, in the aforementioned embodiments, balance adjustment may be executed for the crankshaft after working of the crankshaft is executed by the crankshaft milling machine 30. In this case, it is possible to reduce a period of time that is required for balance adjustment. Additionally, it is possible to reduce the number of crankshafts to be produced as inferior products.

According to the aforementioned processing apparatus, the three-dimensional shape data can be produced without measuring the entire shape of the material crankshaft. Accordingly, the processing apparatus is not required to be provided with a component for measuring the entire shape of the material crankshaft.

The invention claimed is:

1. A processing apparatus for deciding a position of center holes to be bored in a material crankshaft, the processing apparatus comprising:
   a three-dimensional shape data acquiring section configured to acquire three-dimensional shape data of the material crankshaft;
   a tentative center-hole position determining section configured to determine a tentative position of the center holes in the material crankshaft based on the three-dimensional shape data;
   a shape simulating section configured to obtain a simulated shape of the material crankshaft after a predetermined working is simulated for the material crankshaft using the tentative position of the center holes as a reference;
   a balance deciding section configured to decide whether or not a rotational imbalance amount in the simulated shape of the material crankshaft is within a predetermined allowable range; and
   a center-hole deciding section configured to decide the tentative position of the center holes as an actual boring position of the center holes when the rotational imbalance amount is within the predetermined allowable range.

2. The processing apparatus according to claim 1, further comprising
   a three-dimensional shape data generating section configured to generate the three dimensional shape data of the material crankshaft based on measurement data and three-dimensional shape design data, the measurement data being obtained by partially measuring the material crankshaft, and the three-dimensional shape design data being design data of the material crankshaft,
   the three-dimensional shape data acquiring section being configured to acquire the three-dimensional shape data generated by the three-dimensional shape data generating section.

3. The processing apparatus according to claim 1, further comprising
   a working condition deciding section configured to decide whether or not an essential portion as a crankshaft is missing in the simulated shape of the material crankshaft obtained by the shape simulating section,
   the tentative center-hole position determining section being configured to determine a new tentative position for the center holes when it is decided that the essential portion is missing in the simulated shape of the material crankshaft.

4. The processing apparatus according to claim 1, wherein the tentative center-hole position determining section is configured to determine a new tentative position for the center holes when it is decided that the rotational imbalance amount is not within the predetermined allowable range.

5. The processing apparatus according to claim 1, wherein the balance deciding section is configured to calculate the rotational imbalance amount in the simulated shape of the material crankshaft and to decide that the rotational imbalance amount is within the predetermined allowable range when the rotational imbalance amount is equal to or less than a predetermined value.

6. A center-hole working system for a crankshaft comprising:
a processing apparatus configured and arranged to decide a position of center holes to be bored in a material crank shaft,
the processing apparatus including:
a three-dimensional shape data acquiring section configured to acquire three-dimensional shape data of the material crankshaft,
a tentative center-hole position determining section configured to determine a tentative position of the center holes in the material crankshaft based on the three-dimensional shape data,
a shape simulating section configured to obtain a simulated shape of the material crankshaft after a predetermined working is simulated for the material crankshaft using the tentative position of the center holes as a reference,
a balance deciding section configured to decide whether or not a rotational imbalance amount in the simulated shape of the material crankshaft is within a predetermined allowable range, and
a center-hole deciding section configured to decide the tentative position of the center holes as an actual boring position of the center holes when the rotational imbalance amount is within the predetermined allowable range; and
a working apparatus configured and arranged to actually bore the center holes on both end surfaces of the material crankshaft in the actual boring position decided by the center-hole deciding section of the processing apparatus.

7. The center-hole working system for a crank shaft according to claim 6, further comprising
a measurement apparatus configured and arranged to partially measure a shape of the material crankshaft.

8. A computer-readable medium having computer executable instructions for performing a computer process that decides a position of center holes to be bored in a material crankshaft, the computer process comprising:
acquiring three-dimensional shape data of the material crankshaft;
determining a tentative position of the center holes in the material crankshaft based on the three-dimensional shape data;
obtaining a simulated shape of the material crankshaft after a predetermined working is simulated for the material crankshaft using the tentative position of the center holes as a reference;
deciding whether or not a rotational imbalance amount in the simulated shape of the material crankshaft is within a predetermined allowable range; and
deciding the tentative position of the center holes as an actual boring position of the center holes when the rotational imbalance amount is within the predetermined allowable range.

9. A center-hole position deciding method for deciding a position of center holes to be bored in a material crankshaft, the center-hole position deciding method comprising:
acquiring three-dimensional shape data of the material crankshaft;
determining a tentative position of the center holes in the material crankshaft based on the three-dimensional shape data;
obtaining a simulated shape of the material crankshaft after a predetermined working is simulated for the material crankshaft using the tentative position of the center holes as a reference;
deciding whether or not a rotational imbalance amount in the simulated shape of the material crankshaft is within a predetermined allowable range; and
deciding the tentative position of the center holes as an actual boring position of the center holes when the rotational imbalance amount is within the predetermined allowable range.

* * * * *